US006505256B1

(12) United States Patent
York

(10) Patent No.: US 6,505,256 B1
(45) Date of Patent: Jan. 7, 2003

(54) AUTOMATIC SYNCHRONIZATION OF STATE COLORS ACROSS A WEB-BASED SYSTEM

(75) Inventor: Justin E. York, Spring, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/232,409

(22) Filed: Jan. 15, 1999

(51) Int. Cl.$^7$ .............................................. G06F 15/16

(52) U.S. Cl. ................. 709/246; 709/203; 709/248; 709/250; 345/501

(58) Field of Search .................................. 709/203, 246, 709/248, 250; 710/1, 5, 20, 33; 707/10; 382/103, 232, 233, 235, 254, 302; 345/347, 501, 522, 181, 199

(56) References Cited

U.S. PATENT DOCUMENTS

| | | | | |
|---|---|---|---|---|
| 5,761,656 A | * | 6/1998 | Ben-Shachar | 707/4 |
| 5,859,644 A | * | 1/1999 | Stokes et al. | 345/431 |
| 5,963,201 A | * | 10/1999 | McGreggor et al. | 345/326 |
| 5,987,256 A | * | 11/1999 | Wu et al. | 395/707 |
| 6,011,540 A | * | 1/2000 | Berlin et al. | 345/153 |
| 6,091,518 A | * | 7/2000 | Anabuki | 358/500 |
| 6,138,150 A | * | 10/2000 | Nichols et al. | 709/219 |
| 6,157,735 A | * | 12/2000 | Holub | 382/167 |
| 6,182,114 B1 | * | 1/2001 | Yap et al. | 709/203 |
| 6,185,625 B1 | * | 2/2001 | Tso et al. | 709/247 |
| 6,292,166 B1 | * | 9/2001 | Palmer et al. | 345/150 |
| 6,323,969 B1 | * | 11/2001 | Shimizu et al. | 358/523 |

OTHER PUBLICATIONS

Advanced Color Imaging on the Mac OS, Apple Computer, Inc., 1995, cover page, contents page, iii–xiv, 5–3–5–41.
http://www.w3.org/Graphics/Color/sRGB.html, Michael Stokes, Matthew Anderson, Srinivasan Chandrasekar, and Ricardo Motta, A Standard Default Color Space for the Internet—sRGB, Version 1.1, Nov. 05, 1996/Dec. 11, 1998, pp 1–14.
http://www.microsoft.com/hwdev/devdes/colormgmt.htm, Microsoft, Hardware Issues for Color Management, Nov. 23, 1998/Dec. 11, 1998, pp 1–4.
http://www.apple.com/colorsync/benefits/training/elements.html, Apple—ColorSync Training: Color Management, Dec. 11, 1998, p. 1.
http://premium.microsoft.com/msdn/library/sdkdoc/icm/icm_0k50.htm, Microsoft, Color Conversion and Color Management, Dec. 11, 1998, p 1.
http://premium.microsoft.com/msdn/library/officedev/office/output/fl/d3/s5a43e.htm, Microsoft, ColorFormat Object, Dec. 10, 1998, p 1.
http://premium.microsoft.com/msdn/library/officedev/office/output/fl/d6/s5b512.htm,Microsoft, Color Property, Dec. 10, 1998, p 1.

(List continued on next page.)

Primary Examiner—Saleh Najjar
(74) Attorney, Agent, or Firm—Akin Gump Strauss Hauer & Feld, LLP

(57) ABSTRACT

A network provides color translation between a server side application and a web browser application. A color object created on the server side is reduced into the individual color components defining the color property for the object. These discrete color components are then converted into numerical values representing the intensity of the respective component. The color components are then combined into a format usable by a web-based computer application. For objects including text information, the color property for the text is automatically determined, based on the translated color object, to achieve a high contrast between the background color and the foreground or text color.

4 Claims, 5 Drawing Sheets

OTHER PUBLICATIONS http://premium.microsoft.com/msdn/library/tools/vbscript/htm/vsfctrgb.htm, Microsoft, RGF Function, Dec. 10, 1998, p 1.

http://premium.microsoft.com/msdn/library/sdkdoc/gdi/devcons_7khf.htm, Microsoft, Retrieving Graphic—Object Attributes and Selecting New Graphic Object, Dec. 11, 1998, p 1.

http://premium.microsoft.com/windows/platform/icmwp.htm, Microsoft, Color Management in Microsoft Windows Operating System, 4/97/Dec. 11, 1998, pp 1–7.

http://www.w3.org/TR/REC–html32.html, Dave Raggett, HTML 3.2 Reference Specification, Dec. 14, 1998, pp 1–38.

http://www.byte.com/art/9501/sec10/art2htm;Michael Sugihara, State of the Art—Consistent Color, 1/95/Feb. 23, 1999, pp 1–8.

* cited by examiner

AUTOMATIC SYNCHRONIZATION OF STATE COLORS ACROSS A WEB-BASED SYSTEM

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates generally to color translation for computer applications and more particularly to translating the color property of an operating system-based object into a format usable by a web-based application.

2. Description of the Related Art

Network management has experienced explosive growth and become a fundamental part of network infrastructure. Network management is essentially a set of tools and processes that enables one to control, monitor, and troubleshoot a network. A network manager typically uses standalone or integrated network management software to collect and process management data from the network.

One of the functions served by a network management software is the monitoring (or health polling) and notification of the state of various network devices. The state of a monitored device is reported, for example, as an entry in an event log dialog box. However, as the use of network systems has grown, so too has the size of the networks. Todays networks typically include large numbers of network devices. To provide a manageable interface, the network management software has been configured to report only notable aspects of the network or a particular network device. For example, reporting has been restricted to report only certain changes in the state of a particular device. The network conditions or events which trigger this type of restricted reporting are typically referred as network or device alarms.

An alarm is the mechanism used to identify a notable event occurring on the network, such as a change in the state of a device. Specifically an alarm differentiates the notable event from normal network operation. To further streamline reporting performed by network management software, a number of different alarm settings have been used. Specifically, an alarm event type has been used to represent a type of condition, for example a threshold, the occurrence of which may be a notable network event. In addition, differing alarm severities have been used to represent importance levels of an occurrence of a particular alarm event type. A particular alarm severity is typically based on the relative importance assigned, usually by a network administrator, to the alarm or the monitored device. The corresponding alarm severity class depends on the extent to which the threshold had been exceeded. For example, an occurrence of an event only slightly exceeding an alarm event threshold is represented by a "minor" alarm, while an event greatly exceeding the threshold is represented by a "critical" alarm. In addition, an "informational" alarm severity class has been established to provide information for devices not exceeding normal operating conditions.

A number of alarm event and alarm severity combinations may be active. Alarm severity classes, for example, have included cleared (or informational), indeterminate, minor, major and critical alarm classes. To assist the user in distinguishing between the various alarm severity, color coded entries have been used. Event log entries having an alarm contain a field having the color that is associated with the particular alarm. A monitored device having an alarm with a "critical" severity has typically been assigned a red state color. A critical severity indicates that the state of a device has greatly exceeded normal operating conditions, such as dropping or losing large amounts of data. Alternatively, a monitored device having an alarm with a "cleared" severity has been typically assigned a green state color. A cleared severity indicates a device responded to its last health poll. To provide maximum flexibility for user preferences, the alarm severity colors may be capable of modification by a user.

BRIEF SUMMARY OF THE INVENTION

Briefly, according to the present invention, a remote web-based application or interface is able to accurately reproduce, for a network device, state color information received from a server side (or operating system-based) application. The color reproduction techniques are independent of the specific state color being reproduced. Specifically, a translator interprets the state color information as discrete color components representing the intensity of each color component forming the entire color object. Next, this raw color component information is converted to a form compatible with the display requirements of the web-based (or web browser side) application. Since the color translation or conversion is independent of the particular state color being reproduced, automatic transfer of the appropriate state color format is achieved across a network connection without hard coding of approximate web-based color equivalents.

In addition, in accordance with the present invention, object color combinations are automatically adjusted to achieve a suitable color contrast for color objects including both text (or foreground) and background. In particular, upon translation of a first color object from a network device into a format for use by the web-based application, a second color object is calculated to approximate a numerical value closely equivalent to a color object opposite of the first color object. Specifically, once a background color object is translated, a predetermined dark text color or a predetermined light text color is chosen by determining which of the two numerical values is closer to a numerical value representing a color attribute opposite that of the background color attribute.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which.

DETAILED DESCRIPTION OF THE INVENTION

Figure 1:
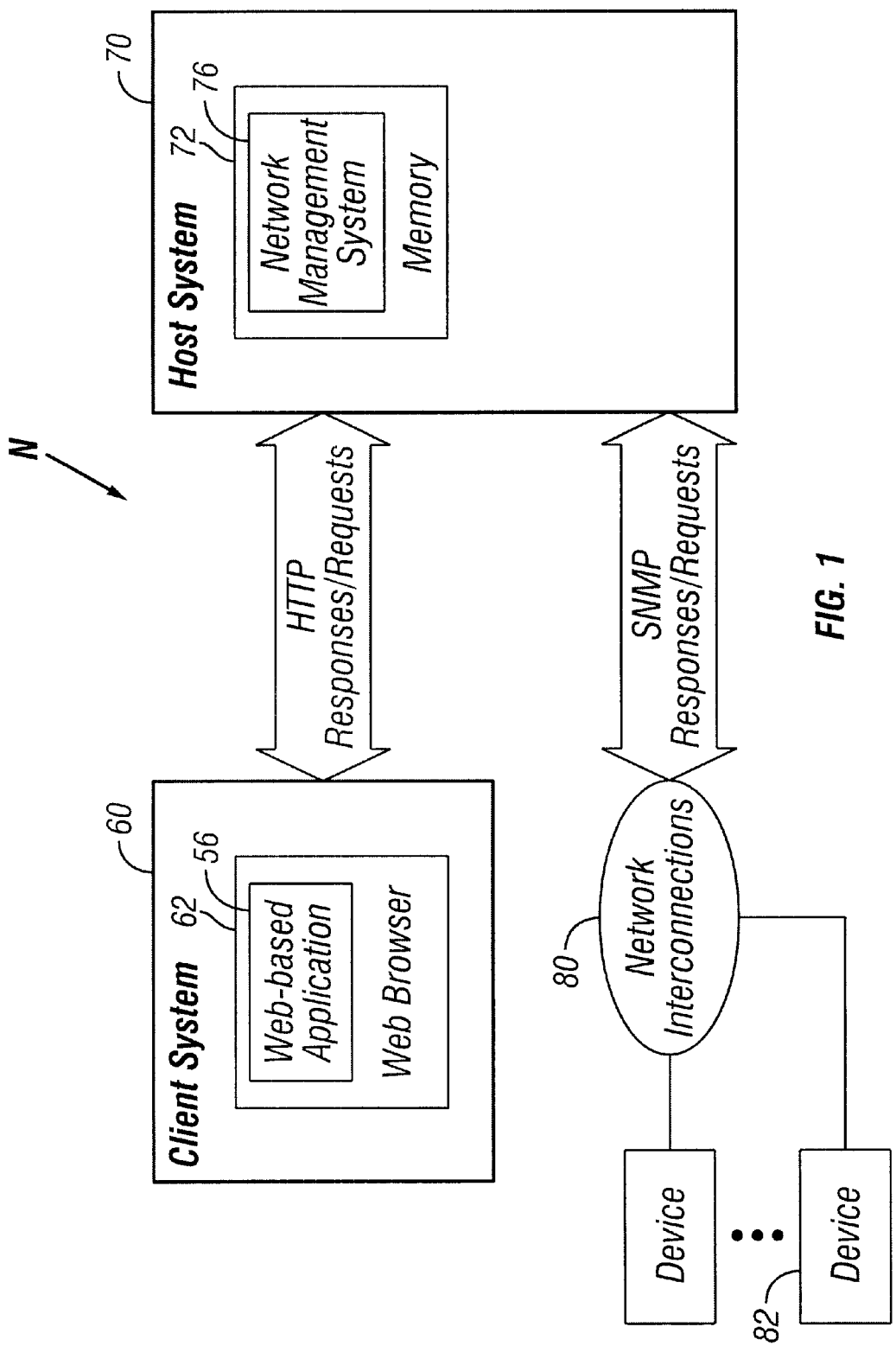
FIG. 1 is a block diagram of a network management system having a web-side network management application and a server-side network management application in accordance with the present invention.

A device management application has been developed that provides automatic monitoring of devices that are connected to a communication network and are manageable using simple network management protocol. Such an SNMP network management application is described in commonly assigned U.S. patent application Ser. No. 09/098,027 entitled "Method and Apparatus for Automatic Monitoring of Simple Network Management Protocol Manageable Devices" to Jeffrey A. Schunicht, Justin E. York, Pete A. Hansen and Charles W. Cochran, filed Jun. 15, 1998, hereby incorporated by reference as if set forth in its entirety.

A remote application has been developed that provides a web-based interface for network management software. Such a remote network management application is described in concurrently filed, commonly assigned U.S. patent application Ser. No. 09/231,286, entitled "Interactive Web-Based Network Management" to Jeffrey A. Schunicht, Justin E. York, Pete A. Hansen and Charles W. Cochran, hereby incorporated by reference as if set forth in its entirety.

A simplified procedure for monitoring devices in a network management system using automatic prepopulation of notification rules is described in concurrently filed, commonly assigned, U.S. patent application Ser. No. 09/231,251, entitled "Automatic Notification Rule Definition for a Network Management System" to Justin E. York and Peter A. Hansen, hereby incorporated by reference as if set forth in its entirety.

The color modification capability of network management software, however, has caused complications for remote applications. Typically, the alarm state colors on a remote application, such as a web-based network management interface, are hard-coded to match the default colors specified on the server side (or operating system-based) network management application. Therefore, a change made to the alarm state colors on the server side application is not reflected on the web-based application. Instead, the web-based software is forced to display only the colors that had been hard-coded into the system. Thus, to avoid inconsistent reporting, the user needed to be aware of this limitation, and modify only the state colors which had a corresponding hard-coded assignment in the web-based application.

In addition, under some color standard protocols or preferences, it has been desirable to have a substantially dark color to represent a specific alarm severity state. In such an instance, however, the default color for text in such a system has typically been black. Thus, the combination of the default black text color and the user defined dark color background object, representing the alarm severity, created a text/background combination having low contrast. Such a low contrast combination rendered the text notations associated with the alarm difficult to discern. Specifically, although network management software has provided user modification of alarm color indicators, the default color of black for text, or foreground, effectively eliminates use of a majority of dark colors as background alarm indicators. As such, the user was again forced to consider color display limitations, specifically color contrast combinations, in configuring the alarm color configurations.

FIG. 1 illustrates a network management system N according to the invention, permitting interactive web-based network management. The system N permits a network administrator to remotely access a network management software program 76 remotely, using web page displayed on a remote web-based computer. A host system 70 is shown. The network management software 76 is stored in memory 72 on the host system 70. The network management software 76 creates a network management interface representing the state of monitored devices 82 to be displayed in the host computer 70. According to one embodiment of the invention, the network management user interface (not shown), created by the network management software 76, is identically presented as a remote network management user interface on the web page of the web-based application 56 on the client system 60.

The host system 70 includes a web interface mechanism (not shown). The web interface mechanism is a software program that makes remote web-based access of the network management software 76 possible. The web interface mechanism translates requests and responses from the web browser side. Communications between the web interface mechanism and the web browser are in hypertext transfer protocol, or HTTP. Communications between the web interface mechanism, more generally the network management software, and the network interconnection are in simple network management protocol, or SNMP.

The network management software 76 communicates with the devices 82 via the network interconnections 80 using SNMP protocol. Of note, if a network administrator was communicating with the network management software 76 on the host system 72 using the network management user interface, only the SNMP protocol would be necessary for communicating with the device 82.

Communication between the web-based interface and the network management software is described in detail in the concurrently filed, commonly-assigned U.S. patent application, Ser. No. 09/231,286, entitled "INTERACTIVE WEB-BASED NETWORK MANAGEMENT", previously incorporated by reference.

Figure 2:
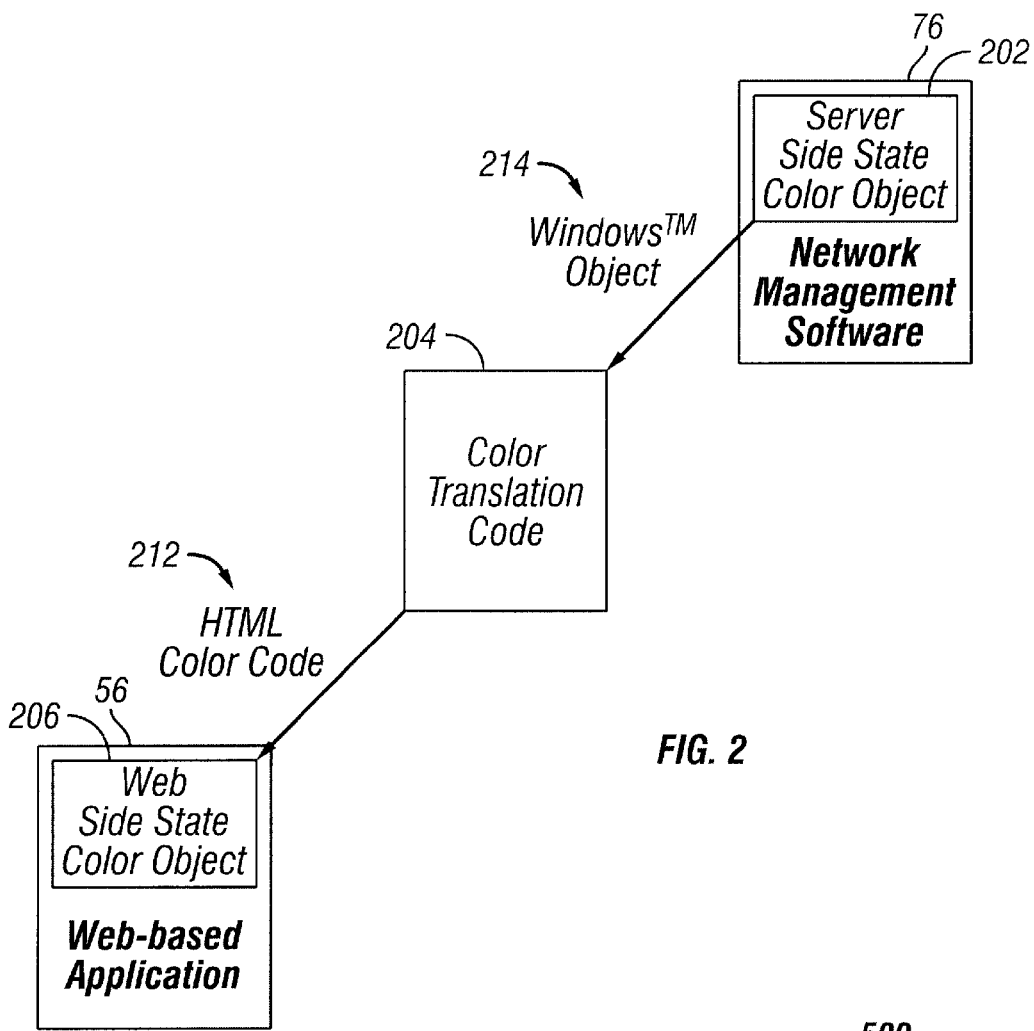
FIG. 2 is a block diagram of a color translation protocol for the network of FIG. 1 in accordance with the present invention.

Turning now to FIG. 2, shown is a block diagram illustrating color translation of a state color object from a server side application 76 to a corresponding web-based application 56 loaded to a web browser 62. According to one embodiment, the color translation code 204 is included in the network management software 76. It will be appreciated however, that the color translation code 204 can alternatively run as part of a remote application.

The translation algorithm 204 begins by receiving color data for a server side state color object 202. The state color object 202 can be associated with any image or text having a color property. The color value assigned to the state color object 202 indicates the color property. In a disclosed embodiment of the present invention, the state color object 202 is associated with a background or foreground. Usually text is the foreground while the background is simply a color apart from the text color. Under the Windows operating system, the color property is defined by an "RGB" function. An RGB color value specifies the relative intensities of a red color component, a green color component, and a blue color component that combine to create a specific color to be displayed. Those skilled in the art will appreciate that the color may be represented in this manner. The intensity of any individual color component is specified by the numerical value representing that component on a range from 0 to 255; the greater the numerical value, the higher the color intensity of the color component.

The color translation code 204 receives a server side object 202 containing a color property from a server side application 210, for example the network management software 76, running under the server side operating system such as the Windows™. The server side object 202 received by the color translation code 204 includes a full set of definitions that describe both the color and style of the object. The color translation code 204 then parses out the data which is only applicable to the color value for the object. Specifically, a "COLORREF" value is separated from the object definitions. The COLORREF value is a 32-bit value used by Windows™ to specify the RGB color value. The COLORREF value is defined by the Windows™ operating system specification and is hereby incorporated by reference. The low order byte contains the numerical value for red, the middle byte contains the numerical value for green, and the high order byte contains the numerical value for blue. After parsing the relevant COLORREF data from the object definitions, the COLORREF value is translated into an hypertext markup language (HTML) string 211 of the format "#RRGGBB". The HTML color code string protocol is defined by the HTML color specification and is incorporated by reference. This HTML color code string 212 is then assigned to a web side state color object 206 and sent to the web-based application 56 within a web browser 208 such as Netscape or Internet Explorer, where the object 206 is then displayed on a screen.

Prior to the present invention, color matching, if any, required that the HTML color strings approximating the color represented by the Windows™ COLORREF value be hard-coded as part of the network management software. Therefore, a modification to an alarm color on the server side application would be correctly displayed on the web-based application only where the modified color was included in the list of hard-coded HTML color strings. Further, since each color to be displayed on the web-based application required its own specific color string, only a limited number of colors could be at least approximately matched. Therefore the present invention provides color matching or color synchronizing without hard coding each and every color translation available, or even providing a less extensive color translation map, for color translation between the Windows™ and the HTML color protocols. The color translation algorithm provides color synchronizing that is dynamic across the range of available colors.

Because the translation is color independent, the color is automatically and precisely matched between the server side application 210 and the web browser 62. Further, since full resolution of color possibilities is achieved between the server side application 210 and the web-based application 56, errors due to hard-coded color approximations are eliminated. The translation process produces the mathematical equivalent of the color value that is received from the server side state color object 202. In addition, since the translation is color independent, individual default color assignments are unnecessary. Direct color translation is achieved for any input color property.

Figure 3:
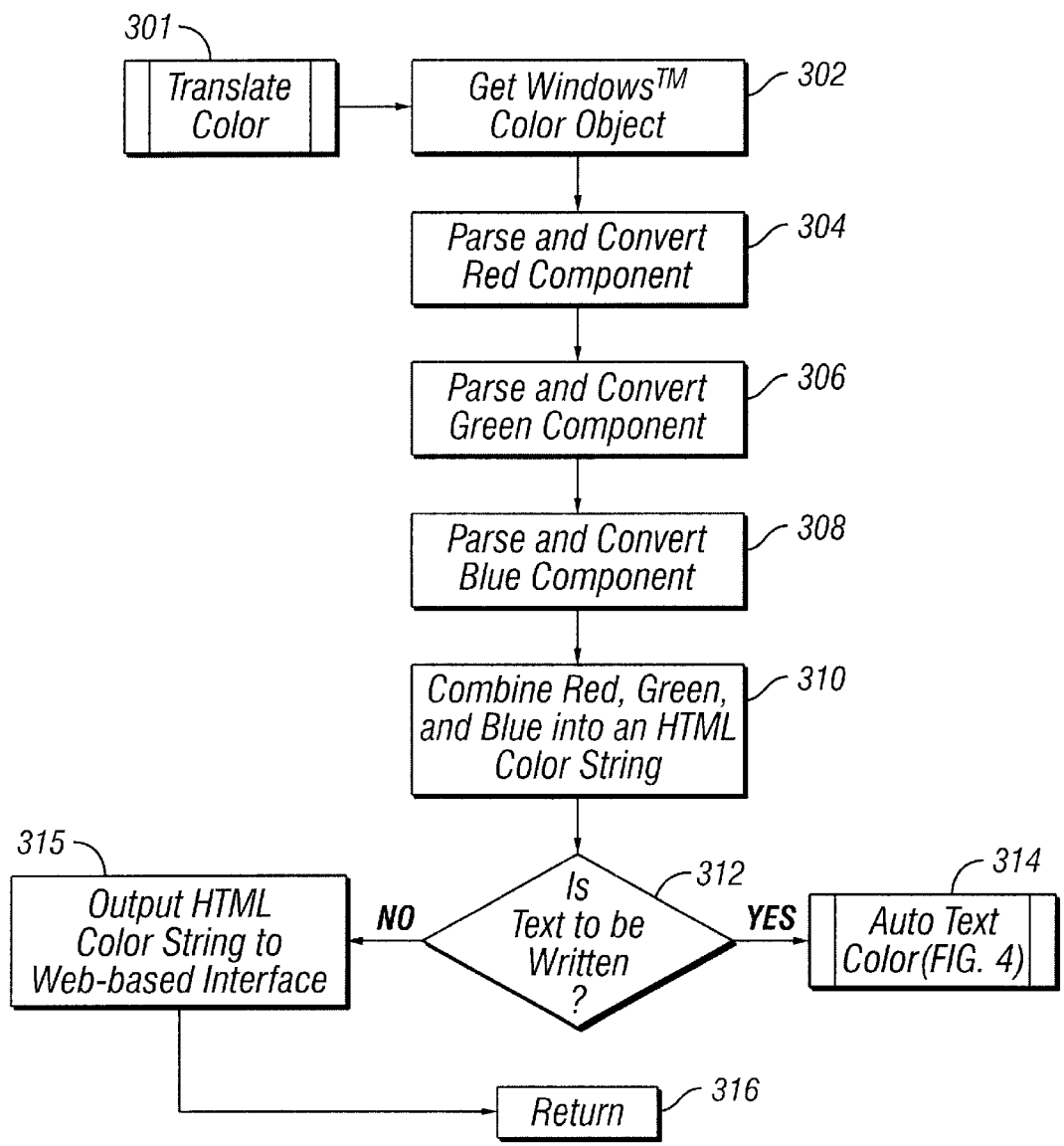
FIG. 3 is a flow diagram of a color translation process in accordance with the color translation protocol of FIG. 2.

Turning now to FIG. 3, shown is a flow diagram for color translation which could be returned by the color translation code 204 according to the present invention. The translate color function 301 begins by receiving a color object 302 from the server side application 210, such as the Windows operating system. The translate color function 301 then proceeds through a series of iterative steps 304–308 each of which individually parses out and then converts each color component comprising the color object. For example, a standard Windows™ color object stores its color in the Win32 standard HBRUSH structure, consisting of a 32-bit value. The low order byte of this 3-byte value is the red value. The middle byte is the green value. The high order byte is the blue value. By parsing and then converting each color component of the color object, the color translation process captures the intensities of each of the respective color components into individual numerical values. These individual color component values are then combined in step 310 into one HTML color string. At step 312, if text is to be written in combination with the translated color object, the Auto Text Color function 314 (FIG. 4) is called. If text is not to be written, the HTML color code string 212 is output to the web browser 62 in step 315 and the function returns in step 316 to the calling function.

In the exemplary server side application 210, the network management application 76 supplies default color settings to represent the various alarm states for monitored devices. Typically, these default color states will include a green state color for representing an "cleared" alarm setting and a red state color for representing a "critical" alarm setting. According to an embodiment of the present invention, however, the network management software 76 allows a user to modify the color settings for the various alarm severity states. Upon a user modification of an alarm color, such as a modification from the default color red to a user modified color green to represent a "critical" alarm setting, the color translation code 204 receives the green color code in the format of the 32-bit binary data structure. Specifically, the green color code is 00000000_00000000_11111111_00000000. The highest order byte is a reserved byte with a value of zero. The second high order byte represents the intensity of the blue color component, the zero value indicating the absence of the blue component in the green color object. The second low order byte represents the intensity of the green color component, the value of 11111111 indicating a maximum intensity of the green color component for the green color object. Finally, the lower byte represents the intensity of the red color component, the zero value (00000000) indicating the absence of a red color component in the green color object. The color translation code 204 then takes this 32-bit value and parses out the intensity value for each of the discrete color components. The red color component may be determined by taking the first byte of the 32-bit value. The green component may be determined by shifting the 32-bit value eight bits to the right and taking the first byte from the now 24-bit value. Finally, the blue color component may be determined by shifting the now 24-bit value eight bits to the right and taking the first byte of the now 16-bit value. It should be appreciated that alternative use of parsing the color object into its discrete color components are possible.

The color translation code 204 next only converts each of the color component values into a hexadecimal equivalent and outputs an HTML color code string 212 incorporating each of these hexadecimal values. The HTML color code string 212 complies to standard HTML color protocol taking the format, "#RRGGBB". In this instance, the translated green color object has a HTML string value of "#00FF00". This HTML color code string 212 is then sent to the web-based interface where the color object is displayed as the green web site object 206. Because the translation is dynamic with respect to the modified color object, the translated web-side color object will match the exact color object as modified on the server-side application. The color-independent translation function avoids the need and limitations of hard coding conversion tables for converting server side object color codes into HTML color codes. In addition, server side color modification is not limited by color approximation required by hard-coded color conversion systems.

Figure 4:
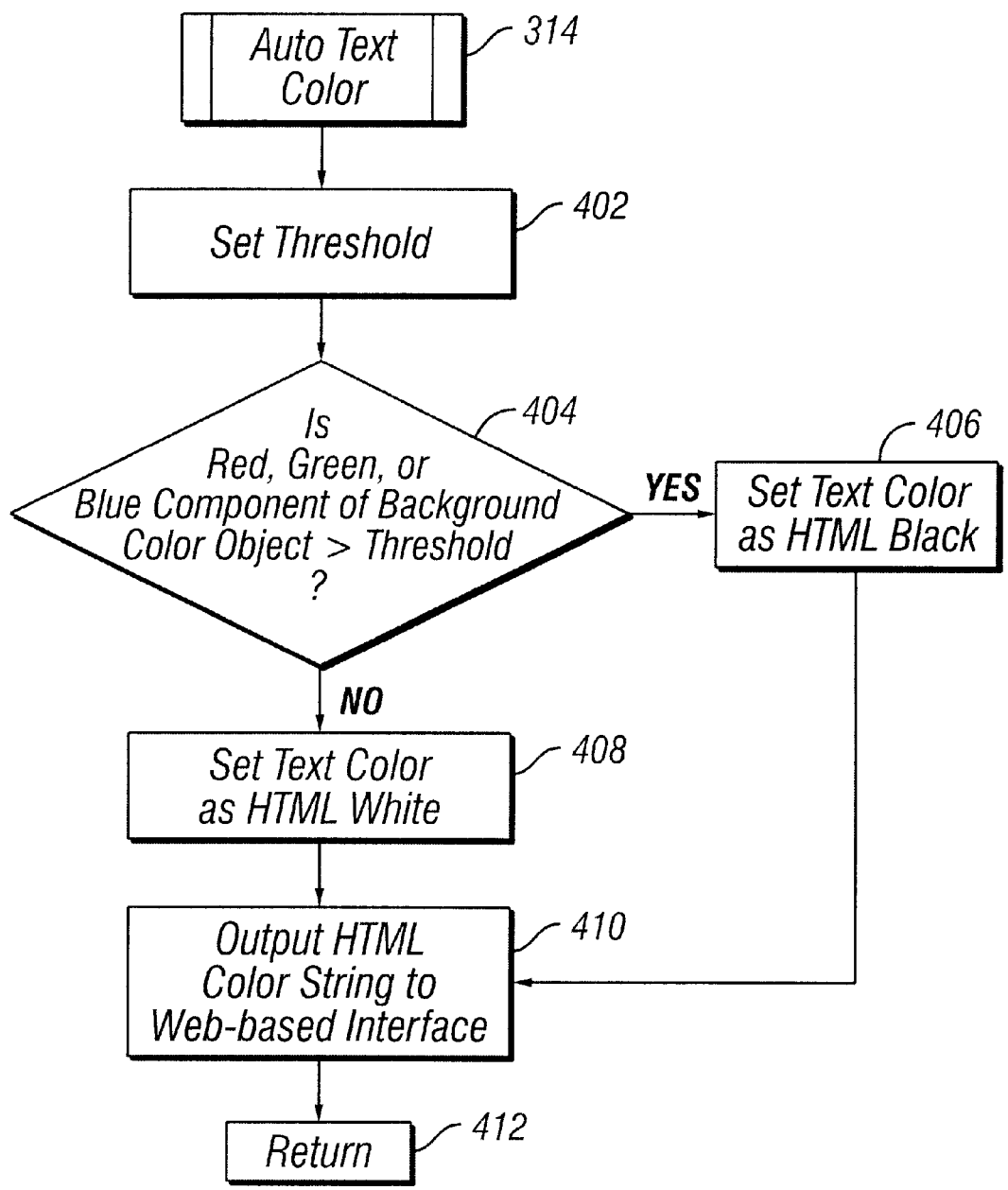
FIG. 4 is a flow diagram of a process for the automatic selection of text color in accordance with the color translation process of FIG. 3.

Turning now to FIG. 4, shown is an Auto Text Color function 314. The Auto Text Color function 314 assigns the color for one region of a color object that has at least two regions, typically a background region and a text or foreground region. The color of the region to be assigned, typically the text, is determined from the color of a previously translated color value for the other region, typically the background color.

The function 314 begins at step 402 where a color intensity threshold is set. The threshold represents the intensity of any individual color component or a combination thereof. This threshold may be either a default value or adjusted manually by a user. Specifically, the threshold value is the value at which the color of the text will be changed from a dark color, such as black, to a light color, such as white. According to an embodiment of the present invention, the threshold is set as the color intensity of any of the color components, red, green, or blue, at an intensity level midway between maximum and the minimum intensity levels. Since each component has an intensity value ranging from 00 h to FFh, the threshold may be the value 80 h. It should be understood that the threshold level can be set as the intensity of any individual color component or any combination thereof. It should further be understood that the color intensity threshold may be predetermined or preset. The default text colors of black and white may be modified to any desirable color combination that provides high color contrast against a wide range of background color and foreground color. Changes in the default text colors will, in most cases, require the threshold setting to be changed in order to maintain s suitable high text/background contrast. A suitably high text/background contrast enables a user to easily discern the text.

The Auto Text Color routine 314 determines, at step 404, whether the intensity for either the red, green, or the blue component of the color object for the background color, or other first region of a color object having multiple regions, translated by the translate color function 301 (FIG. 3) is above the color intensity threshold. It should be appreciated that a variety of mathematical or logic operators might be used to compare a color component with the color intensity threshold. For example, it might be determined if a color component is less than equal to the threshold. If any of the color components has an intensity greater than the default color intensity threshold, then the text color, or other second region of a color object, may be set to black. Alternatively, if none of the [when] components of the background color object has an intensity above the default threshold, the text color may be set to white at step 408. After the text color is determined, its color value is output as an HTML color code string 212 to the web-based interface 56 in the same manner as the background color object translated by the translate color function 301. The routine 314 returns to the calling function in step 412.

The Auto Text Color routine 314 automatically assigns the text color according to the intensity level of any background color component making up the color object. For example, the routine changes the text color from black to white when the intensity for each of the color components drops below 80 h. As an alternative, the text color might be set as the mathematical inversion or opposite of the background color. In such an instance, a threshold would not be needed as the text color would be determined directly from the attentive background color value as translated by the translate color function 301.

Figure 5:
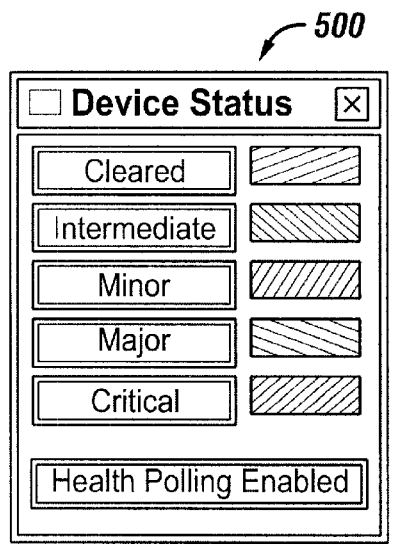
FIG. 5 is a device status screen display illustrating a user configured color setting on the server side application of FIG. 1.

The translate color routine 301 is called whenever a change is made to a color object setting in a server side application. FIG. 5 shows an exemplary device status dialog 500 for exemplary network management system application 76. Each severity alarm corresponds to a different color. A cleared severity alarm corresponds to a green state color. An indeterminate severity alarm corresponds to a blue state color. A minor severity alarm corresponds to a yellow state color. A major severity alarm corresponds to a orange state color. Finally, a critical severity alarm corresponds to a red state color. In such a system, the color indicators assigned to each severity alarm can be modified. Therefore, upon a change initiated by the user at the network management application 76, for example, changing the critical alarm setting from a red indicator to a green indicator, any subsequent alarms of critical type will register as a green indicator on the web browser 62. Likewise, any modification to other severity alarm indicator colors will be immediately seen on the web browser 62 upon its next update. Thus, the color independent translation scheme eliminates the need to provide a number of default color settings and enables a user to customize color alarm indicators according to user preferences.

Figure 6:
FIG. 6 is a screen display illustrating color matching on the web side application of FIG. 1 and automatic text color selection in accordance with the present invention.

Turning now to FIG. 6, shown is an exemplary implementation or application of the Auto Text Color feature. The screen shot 700 shows the various color-coded entries on an event log viewer, displaying device status, for the exemplary network management system N. Specifically, any event log entry that is an alarm is indicated with its alarm status and a color identifier associated with the severity of that particular alarm. In the example shown for the event log screen shot 700, illustrated are three sets of alarm types having different states. According to the event log 700, an alarm has been triggered for a device named router 4 (first row) with a severity of "major" 702. Another device, Netelligent 5226.7 (third row) has triggered an alarm with a "critical severity" 704. Likewise, in rows 6, 9–11, and 13–16 unnamed devices have triggered threshold alarms listed as "critical" but having since been cleared 706. Each of the alarm severity are indicated using different colors. For example, the critical alarm state 704 may be indicated as a red color. On the other hand, the critical alarms that have since been cleared 706, may be indicated as a green color. Other alarm states, severity status of major for instance, are assigned other colors,.

An example revealing the operation of the Auto Text Color routine 314 may be helpful. According to a disclosed embodiment of the present invention, the text color is set at a default of black. Upon a change in the background color caused by a change in the alarm state of a particular device being monitored, or a color change by the user, the Auto Text Color routine 314 is called to select the appropriate contrast between the text or foreground color and the background color. The text color remains black for the critical alarm events 704, indicated with a background color of red, and the critical alarms that have since been cleared are indicated by a background color of green. In those instances, the red, green, or blue components of the background colors, red and green respectively, have intensity value above the preset color intensity threshold. However, the alarm severity major 702 indicated by the background color of brown causes the Auto Text Color routine 314 to change the text color from black to white. In this case, neither the red, green, nor blue component of the background color brown has an intensity value that exceeds the threshold. Therefore, the Auto Text Color routine 314 achieves a suitably high contrast between the background color and the text color providing improved readability independent of the background color assigned. This automatic feature additionally provides increased flexibility allowing a user to modify the colors associated with each particular severity alarm status. Specifically, the Auto Text Color 314 routine changes the color of the text from black to white depending on the darkness or lightness of the alarm color serving as the background for that text. In this way, there is no need to hard-code a table of expected alarm color settings to ensure a user may discern the text from the background color.

Although for exemplary purposes the Auto Text Color routine 314 selects between black and white text or foreground color, it should be understood that any number of color combinations may be used. In addition, although for exemplary purposes high contrast is sought, any gradient of contrast between the background and the text or foreground color can be achieved. For example, in some applications, for example for security reasons, it may be desirable to minimize contrast such that the text and the background colors closely approximate each other. Therefore, instead of switching from a white to a black text color when any color component has an intensity above a preset threshold, the Auto Text Color routine will switch from a black to a white text color above said threshold. Finally, it will be understood that the Auto Text Color routine 314 can be used to automatically select as the text color the mathematical inversion of the background color. In such case, the text color is determined directly from the background color.

The foregoing disclosure and description of the preferred embodiment are illustrative and explanatory thereof, and various changes in the number of variables, number of parameters, order of steps, field sizes, data types, code elements, code size, connections, components, color object types, and circuitry, as well as in the details of the illustrated hardware and software and construction and method of operation may be made without departing from the spirit of the invention.

I claim:

1. A method of converting state colors for a network management application, comprising the steps of:

detecting a first state color object having a first color format on a server side of a network management application; and translating a second state color object having a second color format on a web browser side of the network management application to match the first state color object on the server side, wherein the translating step comprising the steps of:

parsing a red color component, green color component, and blue color component based on the first state color object;

converting red color component, green color component, and blue color component to the second color format; and calculating the second state color object based on a converted red color component, converted green color component, and converted blue color component.

2. The method of claim 1, further comprising the step of:

selecting a foreground lettering color to achieve suitably high contrast with the second color format.

3. A network management system for matching state colors between a host computer coupled to the computer network and a web-based computer coupled to the computer network management system, the network management system comprising:

a computer network;

a plurality of devices coupled to the computer network;

a host computer coupled to the computer network containing a network management application for graphically representing the state of the devices;

a web-based computer coupled to the computer network for remotely displaying the state of the devices;

a program storage device coupled to the host computer and the web-based computer having a computer readable code embodied therein for matching state colors between the device and the web-based device, including:

a code for instructing the host computer to perform the steps of:

detecting a first state color object having a first color format on a server side of a network management application; and translating a second state color object having a second color format on a web browser side of the network management application to match the first state color object on the server side, wherein the translating step comprising the steps of:

parsing a red color component, green color component, and blue color component based on the first state color object;

converting red color component, green color component, and blue color component to the second color format; and calculating the second state color object based on a converted red color component, converted green color component, and converted blue color component.

4. The network management system of claim 3, further comprising the step of:

selecting a foreground lettering color to achieve a suitably high contrast with the second color format.

* * * * *